US006856237B1

(12) United States Patent
Richmond et al.

(10) Patent No.: US 6,856,237 B1
(45) Date of Patent: Feb. 15, 2005

(54) METHOD AND APPARATUS FOR RADIO FREQUENCY SECURITY SYSTEM WITH AUTOMATIC LEARNING

(75) Inventors: Thomas R. Richmond, Santa Ana, CA (US); Suzanne Richmond, San Pedro, CA (US); Patrick S. Kochie, Simi Valley, CA (US)

(73) Assignee: Doorking, Inc., Inglewood, CA (US)

( * ) Notice: Subject to any disclaimer, the term of this patent is extended or adjusted under 35 U.S.C. 154(b) by 348 days.

(21) Appl. No.: 09/603,831

(22) Filed: Jun. 26, 2000

(51) Int. Cl.[7] .................................................. G05B 19/00

(52) U.S. Cl. .................... 340/5.23; 340/5.61; 340/5.71; 340/5.2; 340/5.21; 340/5.62; 340/825.69; 340/825.72

(58) Field of Search ........................... 340/825.69, 5.23, 340/5.71, 5.2, 5.21, 5.61, 5.62, 5.63; 341/176

(56) References Cited

U.S. PATENT DOCUMENTS

| | | | | | |
|---|---|---|---|---|---|
| 4,638,433 | A | | 1/1987 | Schindler | |
| 4,750,118 | A | | 6/1988 | Heitschel et al. | |
| 5,517,187 | A | | 5/1996 | Bruwer et al. | |
| RE35,364 | E | | 10/1996 | Heitschel et al. | |
| 5,949,349 | A | * | 9/1999 | Farris et al. | 340/825.34 |
| 6,049,289 | A | * | 4/2000 | Waggamon et al. | 340/825.31 |
| RE36,703 | E | | 5/2000 | Heitschel et al. | |
| 6,166,650 | A | * | 12/2000 | Bruwer | 340/5.26 |
| 6,167,137 | A | * | 12/2000 | Marino et al. | 380/255 |

OTHER PUBLICATIONS

Letter dated May 17, 2001 from John F. Flannery of Fitch, Even, Tabin, & Flannery.

Claims pending in re–issue application No. 08/700,610 filed Feb. 15, 2000.

A recent opinion by the Federal Circuit entitled, Overhead Door Corporation and GMI Holdings, Inc., v. Chamberlain Group, Inc. filed on Oct. 13, 1999.

A brochure entitled, "MegaCode Transmitters MDT/MDT2/MDT", Copyright 1992 Moore–O–Matic.

A brochure entitled, "Introducing . . . AccessMaster", Copyright 1994 Linear Corporation.

A brochure entitled, "AccessPro Wireless Access Control", Copyright 1995 Linear Corporation.

* cited by examiner

*Primary Examiner*—Michael Horabik
*Assistant Examiner*—Vernal Brown
(74) *Attorney, Agent, or Firm*—J. Mark Holland & Associates

(57) ABSTRACT

A security system for control access of multiple users to a selected area combines rotating electronic security code or equivalent technology with an automatic self-learning receiver. The first transmitter is "learned" by the receiver manually, but subsequent transmitters are learned without the need for actuating the conventional "manual learn" mode of the receiver. Instead, by simply sending the transmit signal twice within a fixed time period, users of the subsequent transmitters use "self-learning" circuitry (interposed between conventional transmitter and receiver technology) in a way that is relatively transparent to the user. Other aspects of conventional systems are provided, such as separate control via computer or otherwise of an authorized list of uniquely-identified transmitters. In alternative embodiments, even the first transmitter/controller can be programmed into the receiver (such as at the time of manufacturing or installing the system).

60 Claims, 9 Drawing Sheets

METHOD AND APPARATUS FOR RADIO FREQUENCY SECURITY SYSTEM WITH AUTOMATIC LEARNING

This invention relates to an improved apparatus and method for secure entry systems, characterized by using a rotating electronic security code or equivalent technology with an automatic self-learning receiver. The invention is especially useful in multi-user applications, where many persons can individually operate or activate a single gate or door, for example. It can also be beneficial for smaller numbers of users, although single users or individual homeowners might find it easier and slightly more secure to use conventional systems (such as those described herein) that require manual "learning".

BACKGROUND OF THE INVENTION

A wide range of "keyless" security systems exist, including remote controlled gate operators and the like for residential, industrial, and/or business installations. Depending on the installation and circumstances, a large number of users may need to pass through a given entry on a regular basis. Similarly, in certain circumstances, there may be a substantial turnover or addition to the number or identity of users needing access (or having authorized access) during any given period of time. For example, employment changes, expansion, and similar factors can affect the number and identity of persons needing access through a particular company's entry gate, door, barrier arm, turnstile, or any other access control point.

In many applications, such systems include multiple transmitters (one is given to each authorized user), each of which activates a single receiver. Transmitters can take many forms, including (without limitation) cards, handheld electronic keys, RF or other frequency button activated devices, etc. The receiver is typically located at or near the controlled gate or door and, upon receiving an appropriate signal from any such transmitter, the receiver activates (typically opens or unlocks) the gate or door.

Security of such entries is improved by providing user-specific remote controls a unique, identifiable transmitter/controller for each user. That improved security normally comes at some cost, in that such user-specific controls can be burdensome to program, use, and administer, if they are available at all.

Such systems vary widely in their complexity and consequent degree of security. For example, transmitters commonly range from 256 code combinations (using eight DIP switches) to 65,536 code combinations (using 16 bit keys).

Criminals or other persons have attacked security system technologies with technologies of their own. Among other things, these counter-efforts include code breakers such as code scanners (signal-generating devices that can generate a massive series of signals, one of which may be the "correct" signal that activates the security system's receiver), and code grabbers (which can surreptitiously record a signal as it is generated by an authorized user, and can subsequently re-emit that identical signal). Such counter-efforts can seriously compromise the security of certain systems.

Later generation security systems attempted to address those counter-technologies. One such effort was to utilize 32-bit keys to increase the number of code combinations. However, this increase in bit keys only added to the number to combinations that a code scanner had to try before the right combination was "cracked." Against a code grabber, this increase provided no additional protection.

Rotating code or code hopping security systems address the problem by utilizing code generators to produce different signals each time a transmitter emits a signal. With the addition of encryption and a 64-bit transmission length, such systems have substantially improved security. "Unique" identifying information is typically "burned" into each transmitter's internal chips or circuitry, and that information can be used within the security system not only to control which transmitters are "authorized" to open a gate (by way of example), but even to track and log which transmitters were in fact used at which time(s). Examples of such improved technology are discussed in U.S. Pat. Nos. 5,517,187 and 5,686,904. Commonly, that "unique" information is part of the signal that is transmitted to the receiver in order to activate the gate, door, etc.

Typically, for these systems to be-effective, the system administrator has to control and track the distribution of the transmitters, but that commonly involves only two actions: an initial "check-out" (when the transmitter is given to the user/tenant) and subsequent "check-in" (such as when the tenant turns in his or her keys/controllers/etc. upon terminating their lease). In the event of some intervening problem, however, such control and tracking of users and their respective transmitters can enable the manager/owner to "disable" the transmitter (even though it has not been returned to the manager/owner) by removing its "identification" from the list of authorized users within the receiver. This "authorized list" is a control level that is independent of the "learning" process required for each transmitter. Even if a transmitter is "learned" into the receiver, this further control can override and prevent activation of the gate or door based on that "unique" identification information in the transmitter.

Newer 64-bit technology has now raised the number of unique code combinations into the billions, and is further secured when combined with the aforementioned rotating code and encryption technologies. Against such systems, contemporary code scanners and code grabbers are ineffective, and at least currently, this type of security system is extremely difficult (or even virtually impossible) to "crack". Foreseeably, further advances in computer technology and manufacture will increase those combinations even further and may add additional "security" aspects to the technology.

Despite their advantages, conventional rotating code or code hopping security systems have some shortcomings. Among other things, they can be difficult or burdensome to administer when there are multiple users and/or there is turnover among the users. This difficulty arises at least in part from the fact that each transmitter (with its "unique" identifying code or other unique information) typically must be "learned" into the receiver (see, e.g., U.S. Pat. No. 5,686,904) before the transmitter is operational. In this "learn" process, a button or several buttons on the receiver are manually pushed, which switches the receiver from normal operation to "learn" mode. While the receiver is in that "learn" mode, the transmitter that is to be "learned" is then aimed towards the receiver and its transmit button pushed. The transmitter emits and the receiver receives a 64-bit or other signal which contains various sub-signals or information (such as a synchronization signal, a button signal, facility code signal, etc.). Once that transmitter's signal is received, compared, and processed, the transmitter is "activated" and available for future use (in effect, the receiver side of the system will thereafter recognize that unique transmitter and its signals as "authorized"). This "learning" process must be repeated for each other transmitter before those other transmitters will activate the receiver.

Consequently, and as indicated above, despite the benefits of this rotating code or code hopping technology, it can be cumbersome to administer in a large user situation. For example, if such a system is used in an apartment or business complex, each tenant's transmitter must be "manually" learned or programmed before the tenant can use it. Such transmitters are used, for example, to open a common gate that permits entry into an apartment complex parking or common areas. Under this scenario, either each tenant must be taught how to program or "learn" his transmitter into the receiver, or the management/owner of the complex must do so for each tenant/transmitter. If there is a power failure, the "learning" can be lost from the receiver (unless flash memory, emergency backup power sources, permanent memory, or similar technology is provided), which requires that all transmitters to be relearned. Even if permanent memory is used, however, other failure of the receiver or access control system can require that all the transmitters be relearned into the replacement equipment. During any such period of inoperability (not only during the power outage itself, but during any period of time required to "relearn" the transmitters), access to the complex can either be precluded (even for tenants that are authorized to enter) or uncontrolled (such as if the gate is left open to prevent a massive number of frustrated tenants from not being able to enter the complex).

Other problems can occur in such multi-user systems, such as when one tenant or user tries to enter through the gate while another transmitter is being "learned". Also, if the apartment manager or owner programs in or "learns" all the transmitters himself, he could be programming hundreds or even thousands of transmitters, a very daunting task.

OBJECTS AND ADVANTAGES OF THE INVENTION

It is, therefore, an object of the present invention to provide an improved security system that provides the heightened security of technology such as rotating code or code hopping, without the administrative burdens currently associated with that technology. The invention is especially useful for installations involving a large user population, although single or small user populations can benefit from the invention as well.

Another object of the invention is the provision of a system of the aforementioned character that has the ability to automatically or remotely "learn" some or most transmitters, such as at least being able to "automatically" learn all transmitters after the first transmitter is "manually" learned.

A further object of the invention is the provision of a security system method and apparatus of the aforementioned character, that automatically learns in new transmitters without the users necessarily realizing that their transmitters are being "learned".

Some of the objects of the invention incorporate aspects of existing technology, such as requiring multiple signal transmissions from any given transmitter before the transmitter is "learned" (this is known within "manually" learned systems). Similarly, although alternative embodiments of the invention could be modified using existing "manual learning" technology to learn via a single transmission (or by more than two transmissions), the preferred embodiment of the invention requires two signals from any given transmitter, thereby taking advantage of the rotating code or code hopping technology. Under anticipated usage, this double press would be relatively transparent to a user, so that the user would not necessarily even realize that he or she was in the "learn" mode.

Yet another object of the invention is providing a security method and system having the ability to manually preprogram (or "teach" or learn into) a receiver the codes or similar information to identify and function with one or more transmitters, so that all transmitters that correspond to such preprogrammed information (including even the first transmitter used) will be automatically "learned" into the receiver upon pressing the transmitter button, thereby avoiding the need to manually learn even the first such transmitter.

A still further object of the present invention is the providing a security system improvement that is compatible with, and has the ability to operate within, a multitude of prior art access control systems (including, by way of example and not by way of limitation, Weigand controllers, computers, and telephone systems).

An additional object of the present invention is the provision of a security system of the aforementioned character, in which the automatic learning of transmitters can occur at any suitable location within the system, or via cooperation of various portions of the system. By way of example, preferred control logic or circuitry of the receiver can be positioned within the actual access control system (such as Weigand or other controllers, an associated telephone or telephone system, an associated computer, etc.) or at any other suitable location capable of interacting with the corresponding transmitters and the rest of the security system.

Other objects and advantages of the invention will be apparent from the foregoing, as well as from the following specification and the drawings.

BRIEF DESCRIPTION OF THE DRAWINGS

FIG. 5 is a flowchart illustrating a preferred embodiment of the receiver algorithm when a new transmitter is manually "learned" in.

DESCRIPTION OF THE PREFERRED EMBODIMENT

Figure 1:
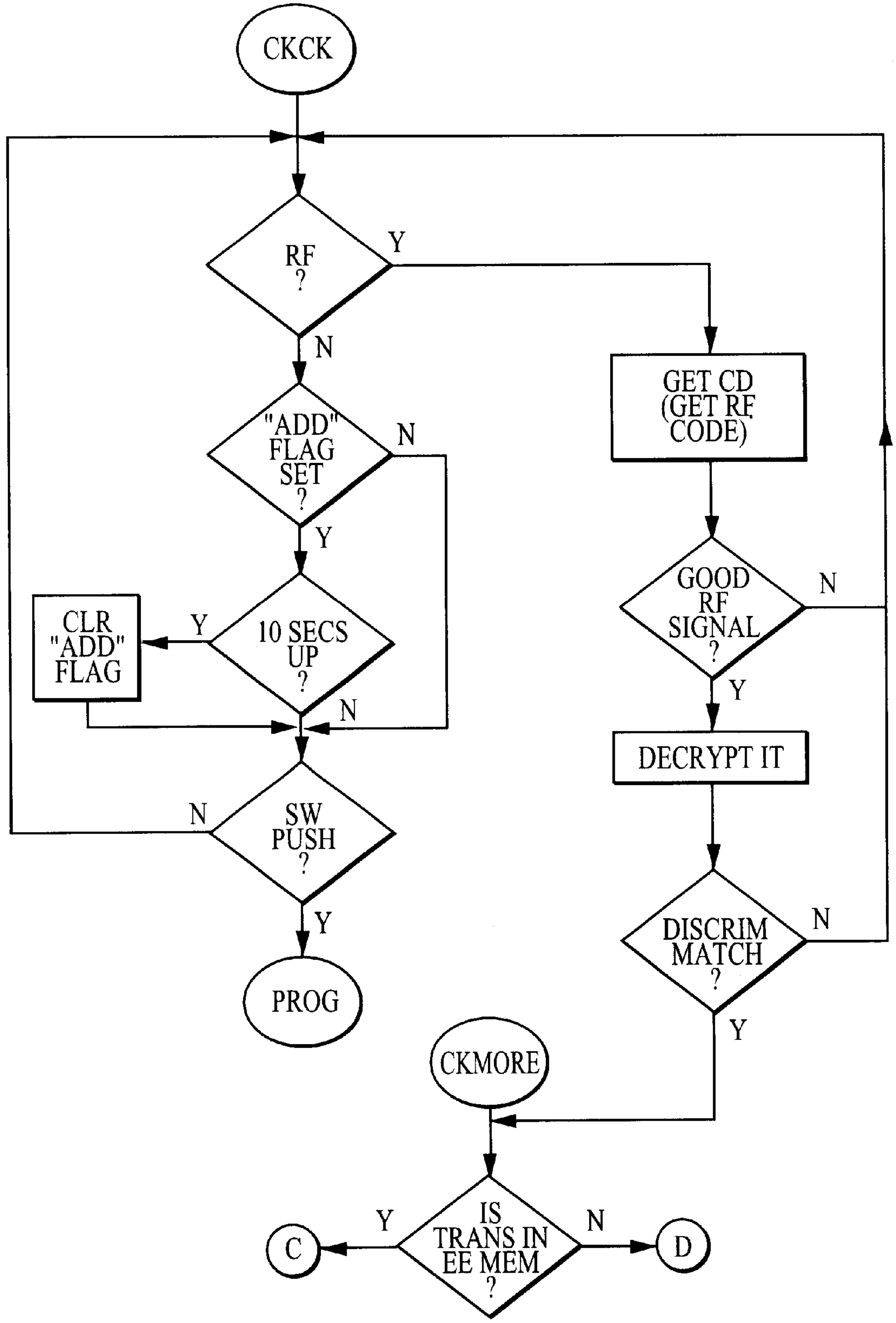
FIG. 1 is a flowchart illustrating a preferred embodiment of the receiver algorithm during its "normal" (non-"learning" or housekeeping) mode.

A preferred embodiment of the invention is illustrated in the Figures, which include flowcharts of interactions between a first transmitter, a second transmitter and a receiver. The preferred method and apparatus can utilize any suitable code hopping encoder and decoder, such as the model HCS301 available from Microchip Technology Incorporated ("Microchip"). Examples of suitable hopping code technology are provided in Microchip's HCS301 product catalog and U.S. Pat. No. 5,686,904, the latter of which is hereby incorporated by reference herein regarding, among other things, its teachings of encryption and decryption algorithms and synchronization or hop code technology.

In a preferred embodiment, a single receiver may be used with hundreds to several thousand transmitters, with the number of transmitters limited only by the receiver memory. As indicated above, the invention is especially useful in applications involving a large number of users (such as in a large apartment complex, a business, or a factory). Persons of ordinary skill in the art will understand, however, that many of the benefits of the invention can be experienced in applications involving a smaller number of users.

Only the first transmitter and the second transmitter are illustrated in the Figures. Persons of ordinary skill in the art will understand, however, that the preferred method and apparatus can include third and subsequent transmitters that are learned and that operate similarly to the second transmitter.

In a preferred embodiment, the receiver is factory programmed with a 12-bit reference discrimination code. This reference discrimination information is unique and contains 12 bits of information that enables the receiver to identify and discriminate authorized from unauthorized transmitters. Authorized transmitters are similarly factory programmed with the same discrimination code.

As indicated above, preferred transmitters can take any suitable form, including (without limitation) cards, handheld electronic keys, RF or other frequency button activated devices, etc. In the preferred embodiment, the receiver first manually learns the characteristics of the first transmitter (similarly to the manual learning required with prior art systems).

The first transmitter is similar to the second transmitter, except the second transmitter has a different transmitter identification signal. By virtue of coordinated programming between the receiver (typically programmed by the installing company) and the transmitters (typically programmed or "burned" in by a manufacturer), the receiver can recognize each transmitters as belonging to an "authorized" group of transmitters. Accordingly, the "first" transmitter can be any of the authorized group of transmitters provided for a particular installation.

Furthermore, because each transmitter is typically programmed or burned with a distinct transmitter identification signal, each individual transmitter can be singled out for different security clearances or similar control processes. For example, tenants might be charged an additional fee each month for access to their complex's pool hall and gym, and their individual transmitter's code can be authorized to allow them entry through gates or doors for those areas of the complex. If they choose to not continue to pay, that code control can be changed by the landlord or manager to remove that user from the "authorized list" for that gate or door, without requiring any changes to the user's transmitter.

With regard to the preferred embodiment generally, and referring to the figures, all transmitters pass through the logic of FIG. 1. Depending on whether the signal is emitted for the first time, the second time, the third time or third time with some problem with aspects of the signal, four different paths, represented by different portions of the figures, will be encountered. Those various paths are discussed in greater detail below, but a general overview is set forth here.

Figure 4:
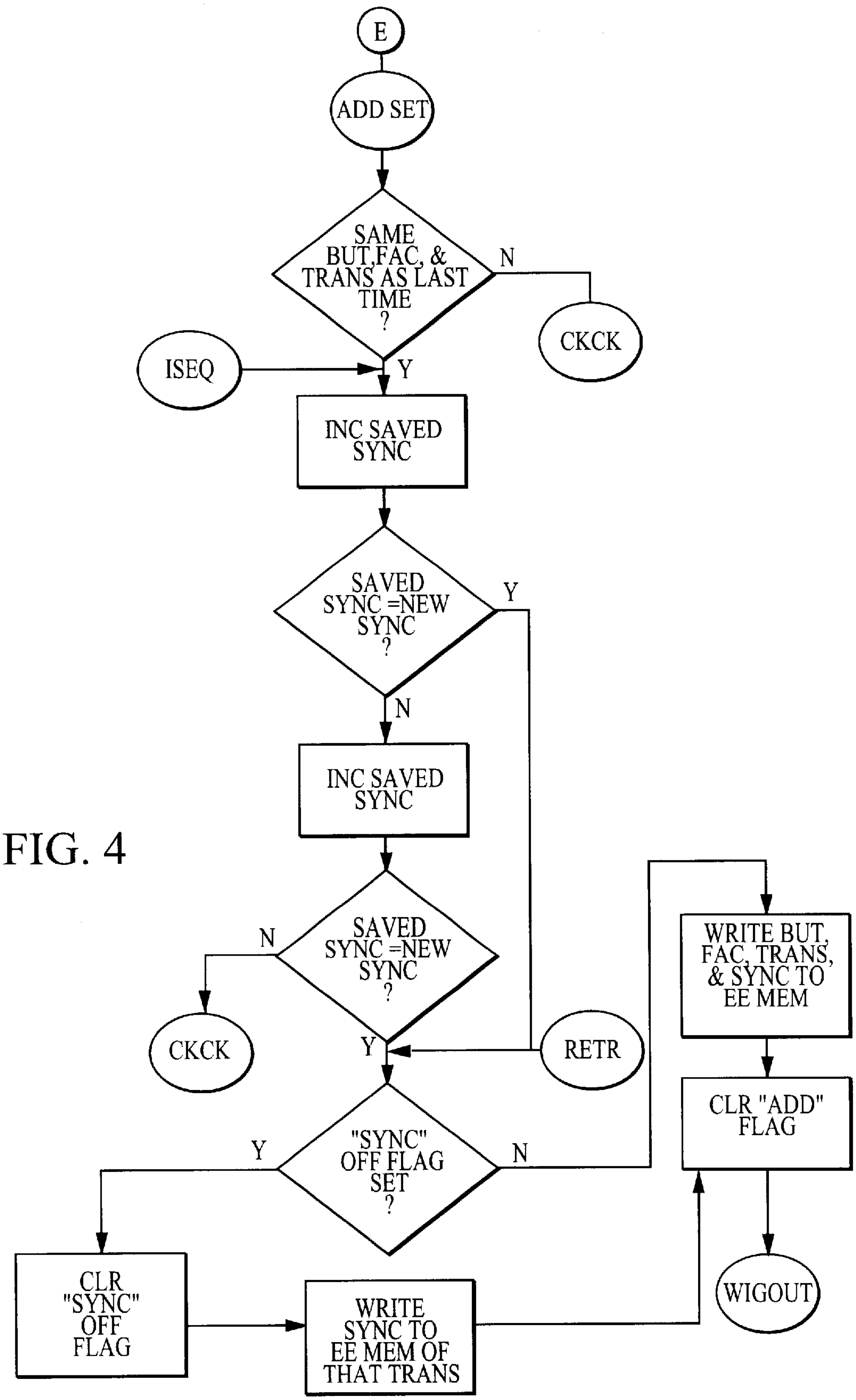
FIG. 4 is a flowchart illustrating a preferred embodiment of the receiver algorithm when a new transmitter is pressed a second time and within a span of a predetermined period (such as 10 seconds).
Figure 5:
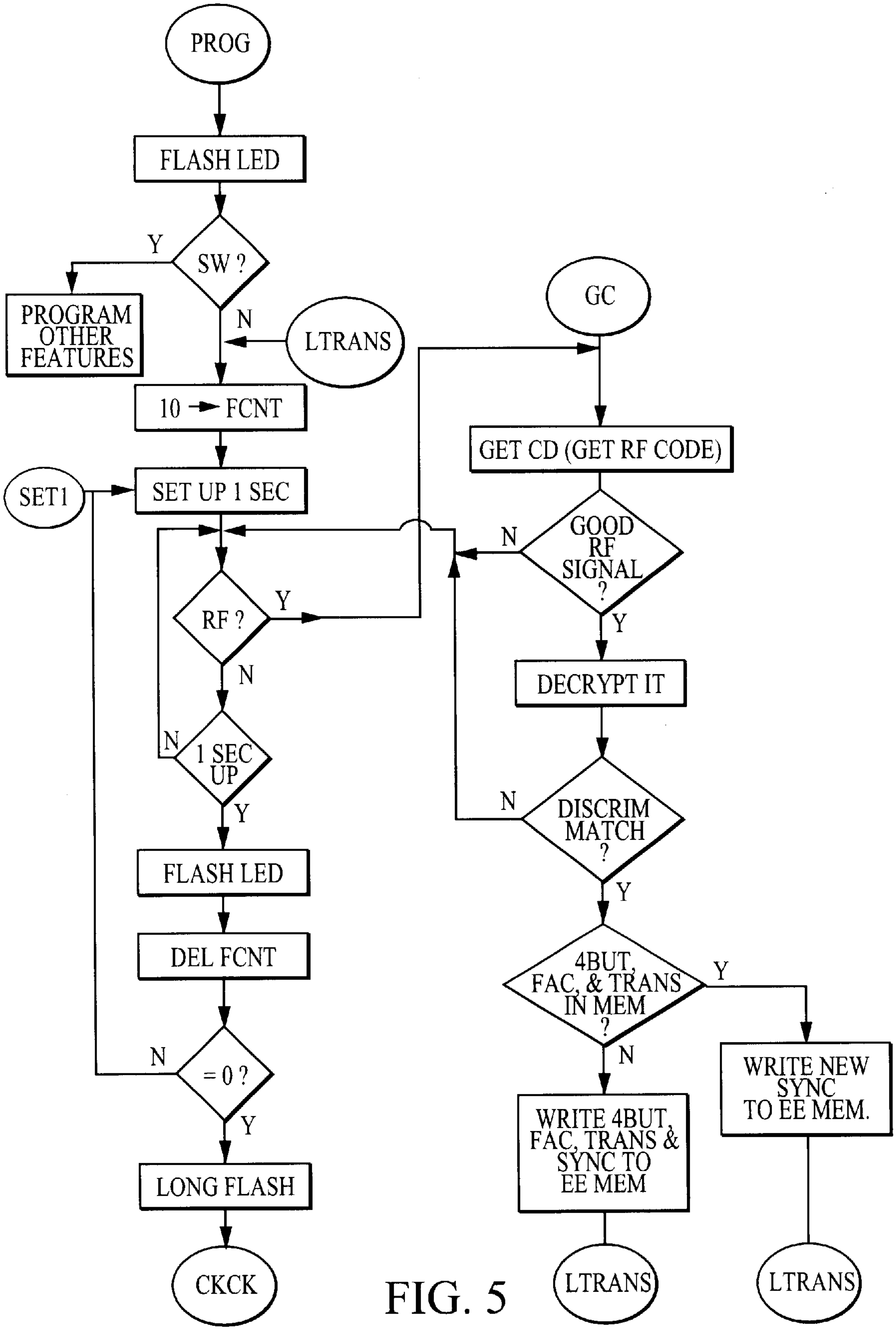

If the receiver is being manually programmed for the first time, the logic proceeds from FIG. 1 then FIG. 5, via the connection PROG 100. If the transmitter emits a second signal for validation, the logic proceeds from FIG. 1 through FIG. 2, via the connection C. If the transmitter emits a third or a subsequent time and there is no problem with the signal and its processing, the logic proceeds from FIG. 1 to FIG. 2. If there is a problem during the third or a subsequent signal emission, however, the logic proceeds from FIG. 1, to FIG. 2, to FIG. 3, to FIG. 1 again, and then to FIG. 4. If a second transmitter emits a signal for the first time, the logic proceeds from FIG. 1, to FIG. 3, to FIG. 1 again, and then FIG. 4. If the second transmitter emits a signal for the second time for validation, it is processed through FIG. 1 then FIG. 2. If the second transmitter is emitted for the third or a subsequent time and there is no problem with any aspects of the signal, processing proceeds from FIG. 1 to FIG. 2. If there is problem with any third or subsequent transmission, processing proceeds from FIG. 1, to FIG. 2, to FIG. 3, to FIG. 1 again, and then to FIG. 4.

In a preferred embodiment of the invention, only the first transmitter has to be manually "learned" in. Once "learned" in, all subsequent transmitters are "automatically learned." That is, subsequent transmitters are initialized without first pressing the learn button on the receiver. Turning now to the logic or circuitry illustrated in FIG. 1, when no transmitter signal is detected, the receiver "keeps house" by continuously updating a ten (10) second timer if the "ADD" flag 20 is set. Persons of ordinary skill in the art will understand that the ten-second interval can be programmed to any suitable length without departing from the scope of the invention. They will similarly understand that the logic or circuitry illustrated in the Figures can be embodied in a wide variety and combination of chips, integrated circuits, and the like, depending on the particular installation and components utilized.

In this "housekeeping" mode, the receiverlooks for the programming switch to be pressed 30. To "learn" the first transmitter, the receiver preferably is manually placed in "learn" mode (such as by pushing a button on the receiver) and the first transmitter is activated to send its signal (typically accomplished by the user pushing a button on the transmitter, indicated by block GC 38 in FIG. 5). The first signal is thereby emitted from the first transmitter and processed by the receiver. In FIG. 1, when the "learn" button on the receiver is pushed, the "SW Push?" block 30 is triggered and the logic or algorithm 10 is moved to the condition illustrated in FIG. 5 (via the common element indicated as PROG 100), to begin a logic sequence.

In the preferred embodiment, the first transmitter may be provided with multiple buttons that can be programmed in various ways, including requiring a user to press a left button, a right button, or both in order to communicate with the receiver. Persons of ordinary skill in the art will understand that, as indicated above, any suitable transmitter device can be utilized within the scope of the invention.

As indicated above, the preferred transmitter signal includes 64 bits of information, although persons of ordinary skill in the art will understand that a wide variety of signals can be utilized effectively with the invention. The preferred 64-bit signal preferably contains encrypted and non-encrypted portions of the signal, including a button signal, a facility code signal, the aforementioned unique "burned-in"

transmitter identification signal (these three portions preferably constitute a first subset of the entire signal) and a 32-bit hop code signal. In the preferred embodiment, the first subset of the signal uses 4 bits for the button information or signal, 12 bits for the facility code information or signal, and 16 bits for the transmitter ID information or signal. Preferably, the 32-bit hop code is encrypted and the others portions of the signal are not. The preferred 32-bit hop code is decrypted into the same 4-bit button information or signal as in the first subset, 12-bit discrimination signal and a 16-bit synchronization signal. As illustrated in FIG. 5, upon detecting this 64-bit signal, the receiver verifies that all 64-bits of the signal are good 42. The receiver then decrypts 44 the encryption component of the 64-bit signal and verifies that the transmitted 12-bit discrimination signal portion matches the receiver's 12-bit reference discrimination code at block 46. If it does match, the receiver confirms 130 whether other characteristics of the first transmitter are already in its memory before writing 132 those characteristics in its electronically erasable ("EE") memory. This writing or storing 132 of information constitutes a "learn-in" process of the receiver. Persons of ordinary skill in the art will understand that other memory will work, including RAM. However, if memory is required without power supply, then EE memory is used.

As indicated above, in the preferred embodiment, if the discrimination signal matches the reference discrimination code at block 46, then the receiver searches its EE memory at step 130 for the same information as the emitted information. When "learning" the first transmitter, the first time that first transmitter's button is pushed, no similar information will be found in the receiver's EE memory bank (unless it has been previously programmed, as discussed in connection with alternative embodiments discussed below). In a preferred embodiment, the receiver then stores 132 in its EE memory the 4-bit button signal, the 12-bit facility code signal, the 16-bit first transmitter identification signal, and the 16-bit sync signal. Persons of ordinary skill in the art will understand that, in alternative embodiments, less than all of this information can be stored in the receiver's EE memory for later verification, use, and processing. The amount of information stored in the EE memory corresponds to a selection by the owner/manager of a balance between (1) a higher or lower level of security (more information stored corresponds to higher security) and (2) a varying degree of flexibility in terms of checking one or more signals before a subsequent transmitter is recognized and processed. In alternative embodiments, the first transmitter can be manually "learned" in at the factory. In such embodiments, when a user pushes the first transmitter button for the first time, he does not have to manually push the receiver's "learn" button.

Once the first transmitter is "learned" in the receiver, the receiver automatically recognizes other transmitters without manual intervention. In a preferred embodiment, this is accomplished by the receiver returning to housekeeping/normal operation mode after learning in the first transmitter. In this condition, there is no output signal unless the first transmitter is pressed a second time. In a preferred embodiment, all transmitters are checked two times before they are initiated, although existing technology can set this to require only one or more than two times. When the first transmitter is pushed a second time, as before, the receiver looks to see that all incoming 64 bits of information/signal is "good" (see FIG. 1, block 42). Once verified, the receiver decrypts a component of the 64 bits of information and rechecks the 12-bit discrimination signal against its own 12-bit reference discrimination code to ensure that they match, at 46. The logic which receives the 64 bit signal, decrypts the signal and verifies whether the discrimination signal matches the receiver discrimination code in the receiver is the same for FIG. 1 as it is in FIG. 5. Therefore, the logic for FIG. 1 and FIG. 5 could be programmed to run as different sub-routines or, in the preferred embodiment, in the same sub-routine.

Persons of ordinary skill in the art will understand that, in alternative embodiments, other signals instead of or in addition to the discrimination signal could be used to validate the transmitters. To clarify, in the preferred embodiment, the first transmitter is "learned" in after the first manual push of the receiver as explained above and shown in FIG. 5. However, there is no output unless the first transmitter is pressed a second time. In contrast, subsequent transmitters are "learned" in when they are pushed twice within a 10 second time span.

If the discrimination signal condition is satisfied (if there is a match at 46), the receiver verifies at 48/50 whether other components of the 64 bits of signal information from the transmitter are already in EE memory. If the result of verification 48/50 is "yes", the circuit/logic continues through connection "C" (which is used in the figures to indicate a flow path connection of the logic rather than any action at that point) on FIG. 1 to "C" on FIG. 2. If the result of verification 48/50 is "no", the circuit/logic continues through connection "D" (which, again, is used in the figures to indicate a flow path connection of the logic rather than any action at that point) on FIG. 1 to "D" on FIG. 3. The "first" signal of the first transmitter (like the first signal of subsequent transmitters) will result in the "D" path. A similar convention is used for "E" on FIGS. 3 and 4.

In passing, and unless the context indicates otherwise, the abbreviations in the Figures should be interpreted as follows: FAC=Facility code; TRANS=Transmitter; CKMORE=Check more; 4 BUT=4-bit Button code; WIGOUT=Weigand controller output.

Persons of ordinary skill in the art will understand that this checking at 48/50 is performed to determine whether the first transmitter is already "learned" or stored in the receiver. If it is already in memory and this is the "second" check, the second check satisfies the multiple check requirement of the receiver. However, since this is the first check, the logic continues with further verification.

Figure 2:
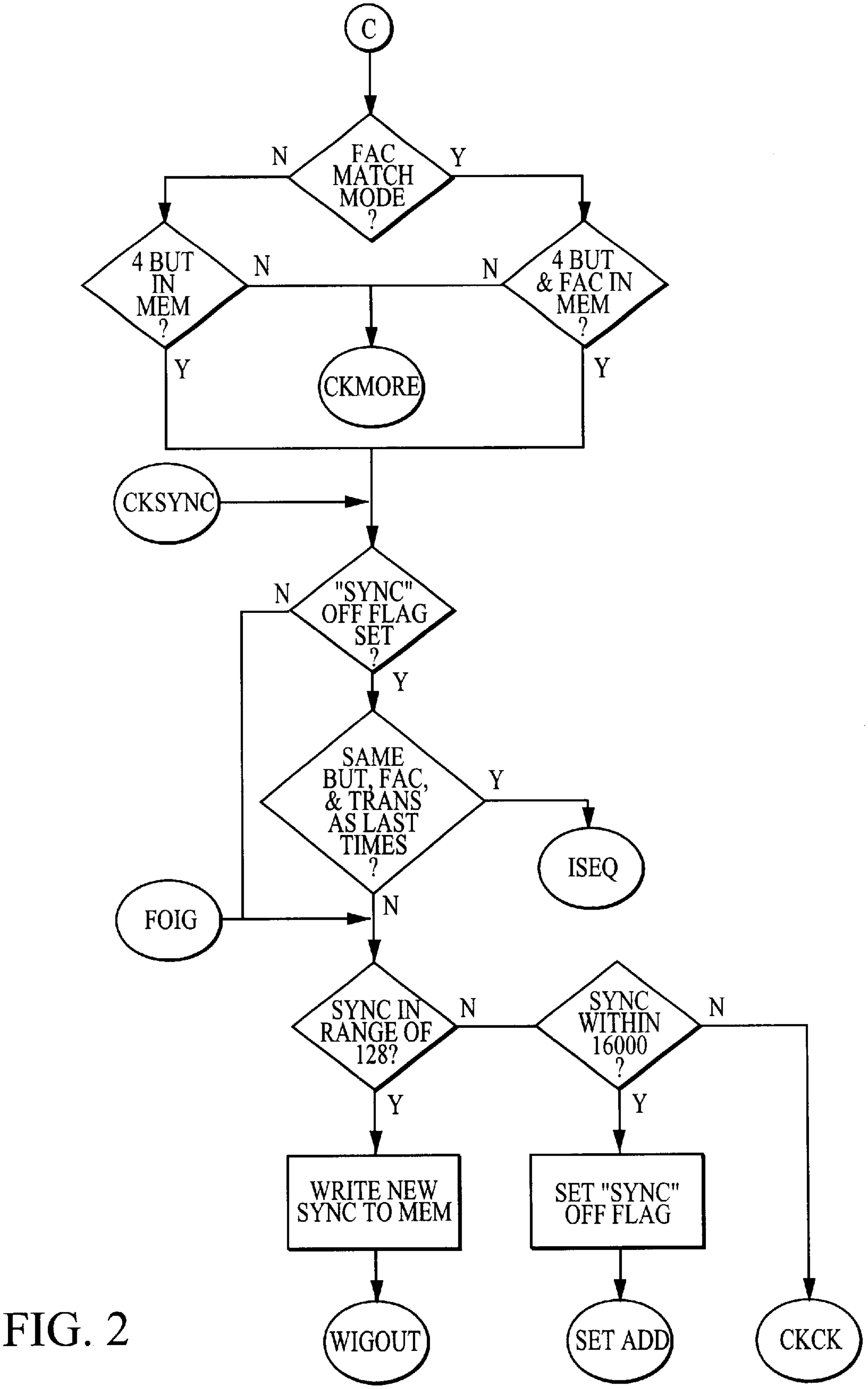
FIG. 2 is a flowchart illustrating a preferred embodiment of the receiver algorithm when information for at least one transmitter is already in memory and a new signal for the same transmitter is being processed.

In alternative embodiments, and as indicated above, the option shown in the block "FAC MATCH MODE?", in FIG. 2, is left to the owner/manager so that flexibility is retained as to the number of signals the receiver must verify before further processing. Among other things, these settings can be programmed via a PC or similar device (not shown) connected to the security system at the installation site.

Figure 3:
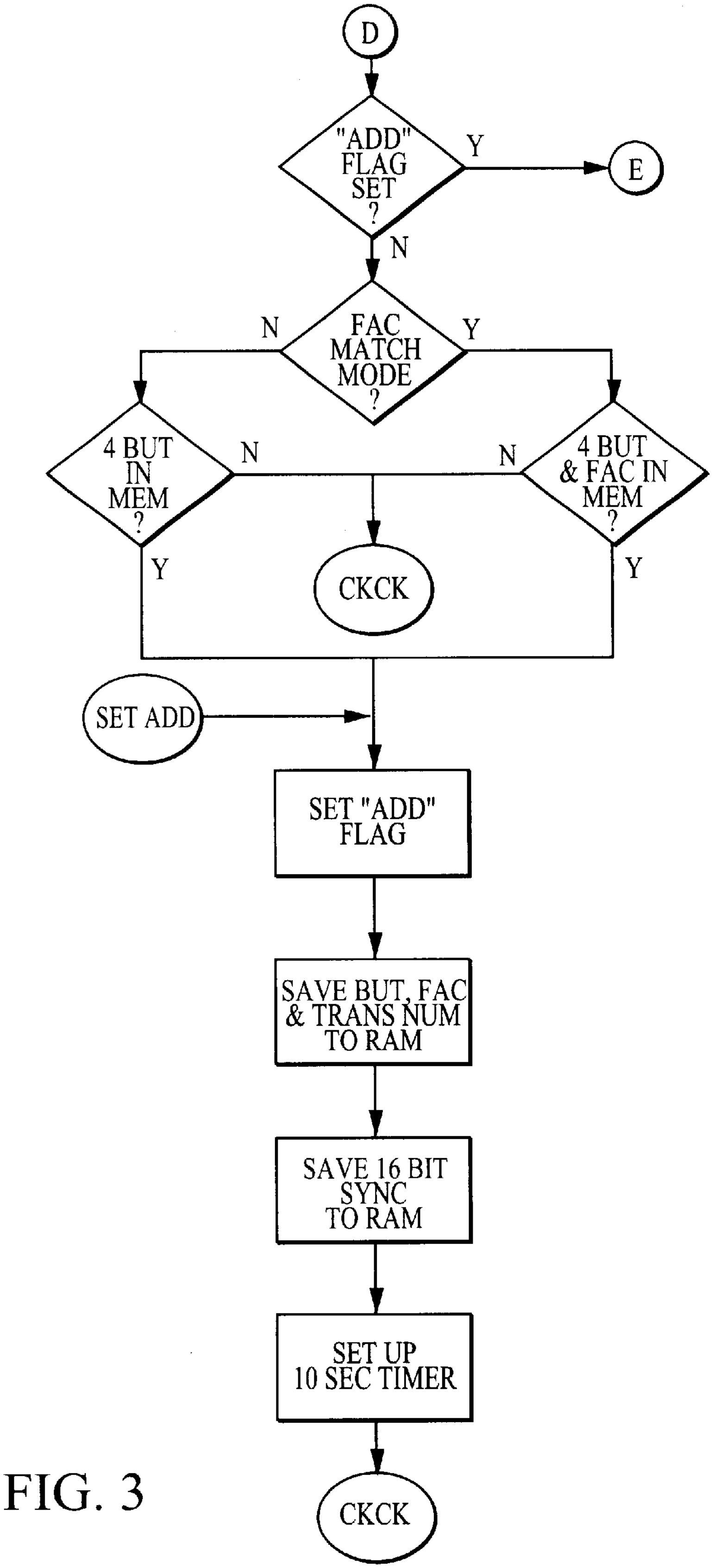
FIG. 3 is a flowchart illustrating a preferred embodiment of the receiver algorithm when a new transmitter is pressed a first time.

In the exercise of "manually learning" the first transmitter, then, the logic proceeds through point D, FIG. 3, and if the "ADD" Flag 300 is not set, the logic proceeds down FIG. 3 to check the parts of the signal in a selected combination and order of information. As illustrated, the FACILITY MATCH MODE 302 logic is encountered, and it is there as a flexibility for checking just the button signal 304 or both the button signal and facility signal 306 before the validation is satisfied. Persons of ordinary skill in the art will understand that the logic through this area of the circuit can be configured to provide higher or lower levels of security (both the FAC and 4 BUT have to match, only the 4 BUT has to match, etc.). In the preferred embodiment illustrated in FIG. 3, only the 4 BUT has to match. If it does not match, the circuit returns to CKCK 12 (FIG. 3) and CKCK 12 (FIG. 1), and "tries" again.

If the 4-bit button information is on the "authorized" list (such as via outcomes "Y" below elements 304 or 306, FIG. 3), the circuit sets the "ADD" FLAG record function 312 and at 314 saves the 4-bit BUT code, the FAC code, and the Transmitter number to RAM or other usable memory. The circuit saves the 16-bit SYNC code to RAM at 316, sets up a 10-second timer at 318, and returns to the CKCK transmitter click 12 (also shown at the top of FIG. 1). Persons of ordinary skill in the art will understand that these steps 312, 314, 316, and 318 can be performed in a variety of orders.

If the receiver instead verifies "yes" at 48/50 (such as a second or subsequent push of the receiver), the circuit can check the parts of the signal in a variety of combinations and orders (similar to the description of elements 302, 304, 306 above regarding FIG. 3). As illustrated, the Facility Code portion of the signal is checked first at 55, followed by the button signal (such as at 56 or 57, depending on the result of the check at 55). Persons of ordinary skill in the art will understand that the logic through this area of the circuit can be configured to provide higher or lower levels of security (both the FAC and 4 BUT have to match or only the 4 BUT has to match, etc.). In the preferred embodiment illustrated in FIG. 2, only the 4 BUT has to match. If it does not match, the circuit returns to CKMORE 58 (FIG. 2) to CKMORE 48 (FIG. 1), and "tries" again.

When the first transmitter is pressed a second time, algorithm circuitry in the transmitter increases the sync number of its second signal above the sync signal of its original signal, this is designated as a second-second sync signal. In the preferred embodiment, the transmitter's sync number increases by one each time a button is pushed. Although persons of ordinary skill in the art will understand that larger increments may also work and will satisfy the same criteria (i.e., that the transmitter's subsequent sync signal be larger than its previous signal). Once a check against the receiver memory for similar information is performed and satisfied (such as illustrated by the "Y" result coming from blocks 56 or 57, FIG. 2, and button, facility and transmitter identification number of block 61), the receiver compares the "new" sync number with the sync number previously stored for that transmitter. If the new sync number is larger and it is within 128 of the prior sync number 64, the new sync number is stored in the receiver EE memory and a clearance signal is output for clearance. This is shown in FIG. 2 as a "WIGOUT" output. In a preferred embodiment, the new sync number must be between 1 and 128 larger in number than the prior sync number, although persons of ordinary skill in the art will understand that other numbers will work as well and the numbering scheme is limited only by the amount of receiver memory. Likewise, instead of a WIGOUT output to a weigand controller, other signals and other access controllers may be configured and used, such as a computer or a telephone system.

In situations where the first transmitter is accidentally pressed while it is carried in a purse or a pocket, the sync number in the transmitter increases the same number of times as the number of accidental pressing. If this number is 129 or larger, the next time the receiver receives a signal from this first transmitter, the receiver will not generate an output. If it is 128 or less, the receiver and transmitter go off without further verification (see FIG. 2 blocks 64 and 65) and an output signal is sent. Instead, if it is between 129 and 16,000, the receiver requires that the first transmitter verifies itself again before given clearance.

The process is initiated by setting the "SYNC OFF FLAG" 67. A person of ordinary skill in the art will understand that a 16,000 limit is arbitrary and that other numbers will suffice, limited only by the receiver memory. In a preferred embodiment, if the new received sync signal is above 16,000, the receiver ignores the 64 bit information and resets itself to housekeeping mode. A sync signal outside of this range cannot be verified and is assumed to come from an illegal transmitter. Likewise, if the 64 bit information and the 12 bits discrimination signal do not match, then the transmitter cannot be verified and is assumed to be from an illegal transmitter. Where a new 64 bit information with a sync signal between 129 and 16,000 of the prior sync signal is received, the first transmitter is "auto learned" as if transmitted for the first time. In this case, on the logic moves to "SET ADD" 69 and the button signal, facility code signal, first transmitter signal and new sync signal or second-second sync signal are written to random access memory ("RAM") (FIG. 3 block 314 and 316) and a 10 second timer is set 318. The logic then looks for a new signal 12. When a follow up signal is received within the next 10 seconds, the receiver again verifies the 64 bit signal 42, decrypts the signal 44 and verifies the discrimination signal for matching 46. If satisfied, the receiver further checks that the incoming button signal, facility code signal, first transmitter signal and second-second sync signal matched the ones just saved in RAM 61 (see FIG. 4). The logic moves to FIG. 4 because the "ADD FLAG" was set in FIG. 3.

During the verification process for a sync number that is out of range, the logic proceeds first by verifying that the new sync number is in the range of the one previously stored 72, FIG. 4. Since it is, because this is a second signal emitted within 10 seconds, the receiver moves the logic to block 86 and stores the first-second subset including the 4 bit BUT signal, 12 bit FAC code signal and 16 bit first transmitter identification signal and 16 bits sync signal, or first-second sync signal, in EE memory 86. The receiver then clears the "ADD" flag 88 and sends a WIGOUT signal 68. In a preferred embodiment, the second sync signal, must be within 2 of the first sync number that was just stored in RAM. However, a person of ordinary skill in the art will understand that other higher increments may also serve the same purpose.

If the new sync number is not the same as the previous sync number 72, the old sync number in the receiver is increased 74, and a second check of the old sync number against the new sync number takes place. This logic verifies that when a new signal is emitted within 10 seconds of the old signal, the new sync number is 2 of the old sync number. Once verified, it then stores the first-second subset as described above.

In real life situation, if a user encounters the above scenario wherein the user presses his transmitter button and nothing happens, he will undoubtedly press it again, probably within 10 seconds. In doing so, he will gain access to whatever location or thing he desires without having to manually reset the receiver. This is the case described above.

When a second user with a second transmitter is pressed for the first time, like before, the second transmitter emits a 64 bit signal which includes 4 bit button signal, 12 bit facility code signal, 16 bit second transmitter signal and 32 bit hop code signal (block 42, FIG. 1). The receiver decrypts the signal and verifies that the 12 bit discrimination signal matches the 12 bit reference discrimination code 46. The receiver then processes the other information and determines whether the second transmitter is already in memory 50. Since this second transmitter has not been entered, no "SET FLAG" has been set 300, so the receiver proceeds to verify whether there it is in a "FAC MATCH MODE" 302. If so, both the 4 BUT and FAC are verified, if not, only the 4 BUT signal is verified 304. Once satisfied, the logic proceeds with setting the "ADD FLAG" 312 and stores the BUT, FAC and TRANS signals to RAM 314.

As with the first transmitter, the logic will not emit an output unless the second transmitter is verified a second time. Thus, a 10 second timer is set 318 and the logic looks for a second signal 12. If the transmitter is pressed again within 10 seconds, the 64 bit signal is checked 42, the receiver decrypts 44 the signal and the discrimination signal is verified 46 (FIG. 1).

Since this second transmitter is not in EE memory, the logic proceeds to "ADD FLAG SET?" 300 of FIG. 3. In determining that it is set, because this is a second emission within 10 seconds of the first, and the flag was set during the first emission, the logic moves to block 61, FIG. 4. The receiver then verifies that the second signal from the second transmitter has a same second-second subset signal (which include the button signal, facility code signal and second transmitter signal) as the ones previously emitted and stored in RAM 61. The new sync signal, also known as a second-second sync signal is then verified and stored in memory if it is 2 of the previous sync signal. The receiver performs this functions by increasing the previously saved sync number 70. The logic then determines whether the saved sync (with the increase 70) equals the newly emitted sync 72. If they are equal, the logic moves to block 80 "SYNC OFF FLAG SET?". Since the flag is set, it writes the button signal, facility signal, transmitter identification signal and new sync number to EE memory 86, clears the "ADD" flag 88 and sends an output signal 68.

If the second transmitter is pressed a third time and emits a second-third signal, that signal is processed through the logic of FIG. 1 and FIG. 2 the same way as did the second signal of the first transmitter. The second-third signal, as before, includes sub-components. They consists of the same button signal, the same facility code signal, the same transmitter identification signal, the same discrimination signal and a new second-third sync number. In a preferred embodiment, after a receiver has been "learned" in, either automatically (as in the second transmitter) or manually (as in the first transmitter), a user only needs to push the transmitter once for entry. The only exception is when the sync number of the user transmitter is 129 times larger but 16,000 times smaller than the prior sync number. Under that scenario, the user must push the transmitter a second time and within 10 seconds of the first push in order to "re-learn" the transmitter and gain access, as described above.

In an alternative embodiment, the logic just described does not have to be located in a separate receiver. Instead, a receiver could be a phone system and the phone system itself may determine admittance, not a weigand controller. Alternatively, the logic may reside in a computer or some other device that is capable of making a final determination. Still another alternative, the logic may reside in a device but that device does not make a final determination. A person of ordinary skill in the art will understand that the logic described in the foregoing permits automatic learning in a security system and that ultimate clearance determination could be performed by a multitude of device currently in the prior art. As such, the receiver could be any one of those devices or a separate device connected to one of those controllers.

Figure 6:
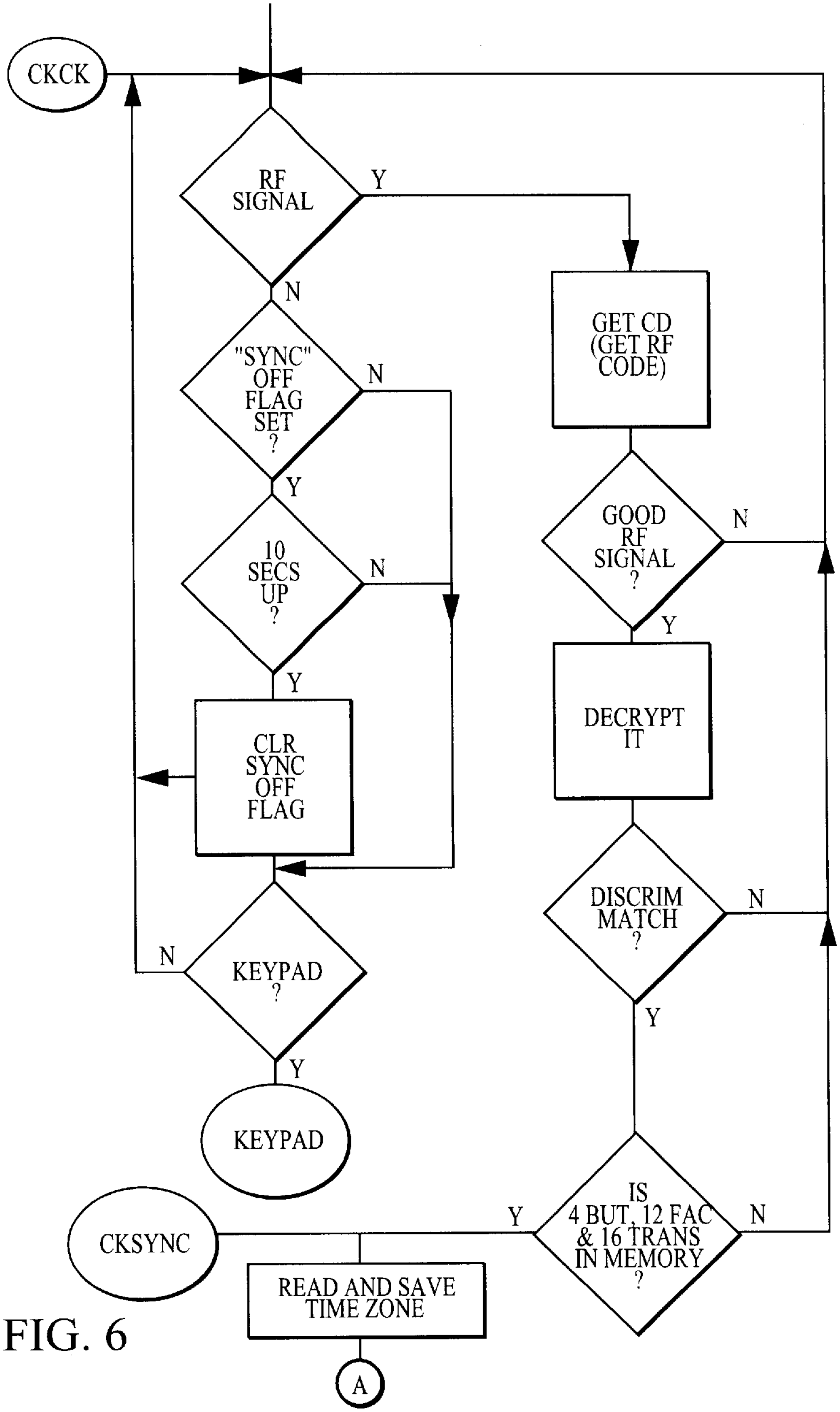
FIG. 6 is a flowchart illustrating one of the many alternative embodiments of the receiver algorithm during "normal" housekeeping mode.
Figure 9:
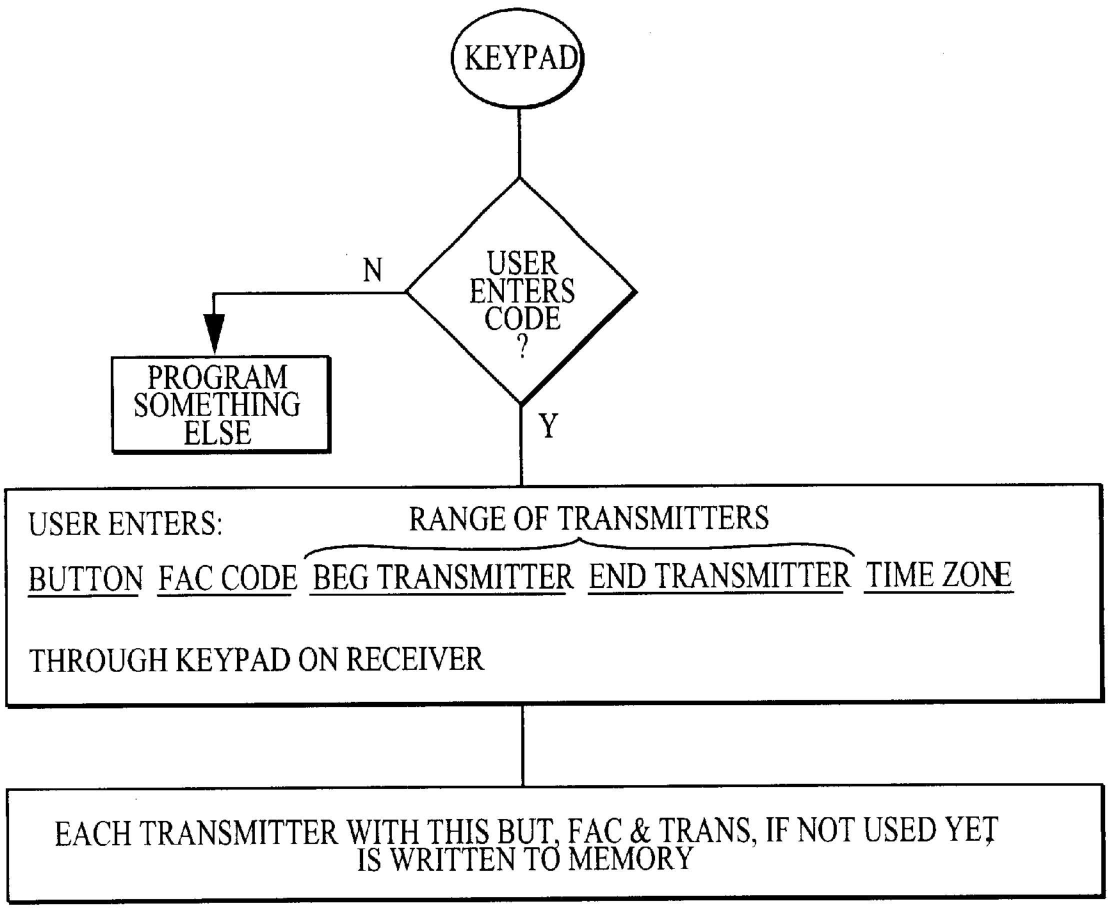
FIG. 9 is a block diagram depicting a preferred method of entering information into a receiver within the invention.

In an alternative embodiment, all button signals, facility code signals and a range of transmitter identification signals are manually programmed into the receiver (see FIG. 9). When the first transmitter is then used for the first time, it must be pushed twice within 10 seconds in order to validate the first transmitter. If so, only the sync signal of the first transmitter is written to EE memory. Referring to FIG. 6, when no signal is detected, the receiver keeps house by updating a 10 second timer. In this mode, the receiver waits for a user to input program features.

In this alternative embodiment, as before, the receiver keeps house by continually updating a 10 second timer, FIG. 6 block 308. Once a button on the receiver keypad 312 is pushed, the logic moves to FIG. 9. Information for a group of transmitters are then entered by a user 500. The entered information is entered via a keypad located on the receiver. The entry includes the button signal, facility code signal and a range of transmitter identification signals 504. In addition, the user may enter a time zone for that entry to further restrict access to a particular transmitter, several transmitters or a range of transmitters, among other things, for entry during a particular period only. Once entered, the button signal, facility code signal and transmitter identification signal for the first transmitters and all subsequent transmitters within that range of transmitter identification signal are written to EE memory 506.

Back in FIG. 6, when the first transmitter is pressed for the first time, the receiver verifies that all 64 bits signal is good 316 (for ease of illustration, only the first transmitter is discussed since all transmitters are validated the same way). It then decrypts 318 the encrypted portion of the signal and verifies that the incoming 12 bits discrimination signal matches its 12 bits reference discrimination code 320. The receiver determines whether this first subset signal is already in memory 322. If yes, it reads the time zone for the first transmitter 324.

Since this is a first emission, the "SET SYNC OFF FLAG" is set (see FIG. 7 block 396) to begin learning the first transmitter, specifically the sync number of the first transmitter. The logic then moves to block 354 since this is the first time this transmitter is used. "SET SYC" 356 is triggered and the first subset including the button signal, facility code signal and first transmitter identification signal and the first sync signal is then saved in RAM 398 and a 10 second timer is triggered 402. The receiver then waits for a second validating signal at "CKCK" 300. In a preferred embodiment, 10 seconds is used in conjunction with two successive pushes of a button for validation. Persons of ordinary skill in the art will understand that different combinations may suffice such as waiting 15 seconds between two successive pushes or 5 seconds between three successive pushes. The goal is to require validation by having additional looks, including a second look, at the incoming signal before the transmitter is validated.

Figure 8:
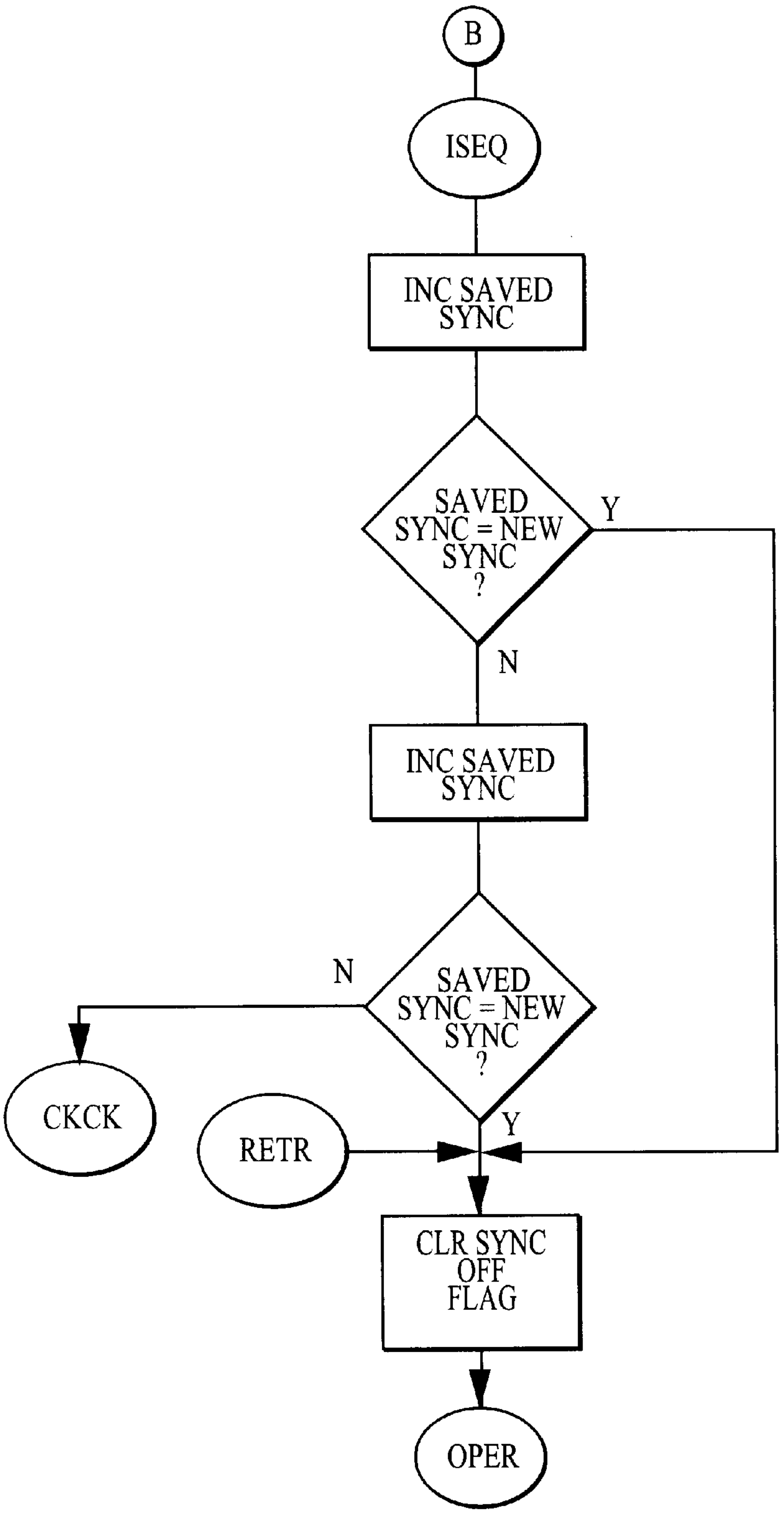
FIG. 8 is a flowchart illustrating one of the many alternative embodiments of the receiver algorithm when a new transmitter is pressed a second time (within a predetermined period).

When the first transmitter is pressed a second time, emitting a first-second signal, and within 10 seconds, the 64 bits signal (including a first-second subset signal) is checked, FIG. 6 block 316, part of the signal gets decrypted 318 and the discrimination signal is verified 320. Since the first subset signal and first sync signal are now in RAM 398, the first-second subset signal is compared with the previous first subset signal (see FIG. 8 block "ISEQ" 360). IF the previous saved sync equals the new first-second sync 422, the "SYNC OFF FLAG" 432 is cleared and the logic moves to output a command 368. If the two sync numbers do not match, the new sync is saved 426 and the logic looks for a second check to verify 300.

Figure 7:
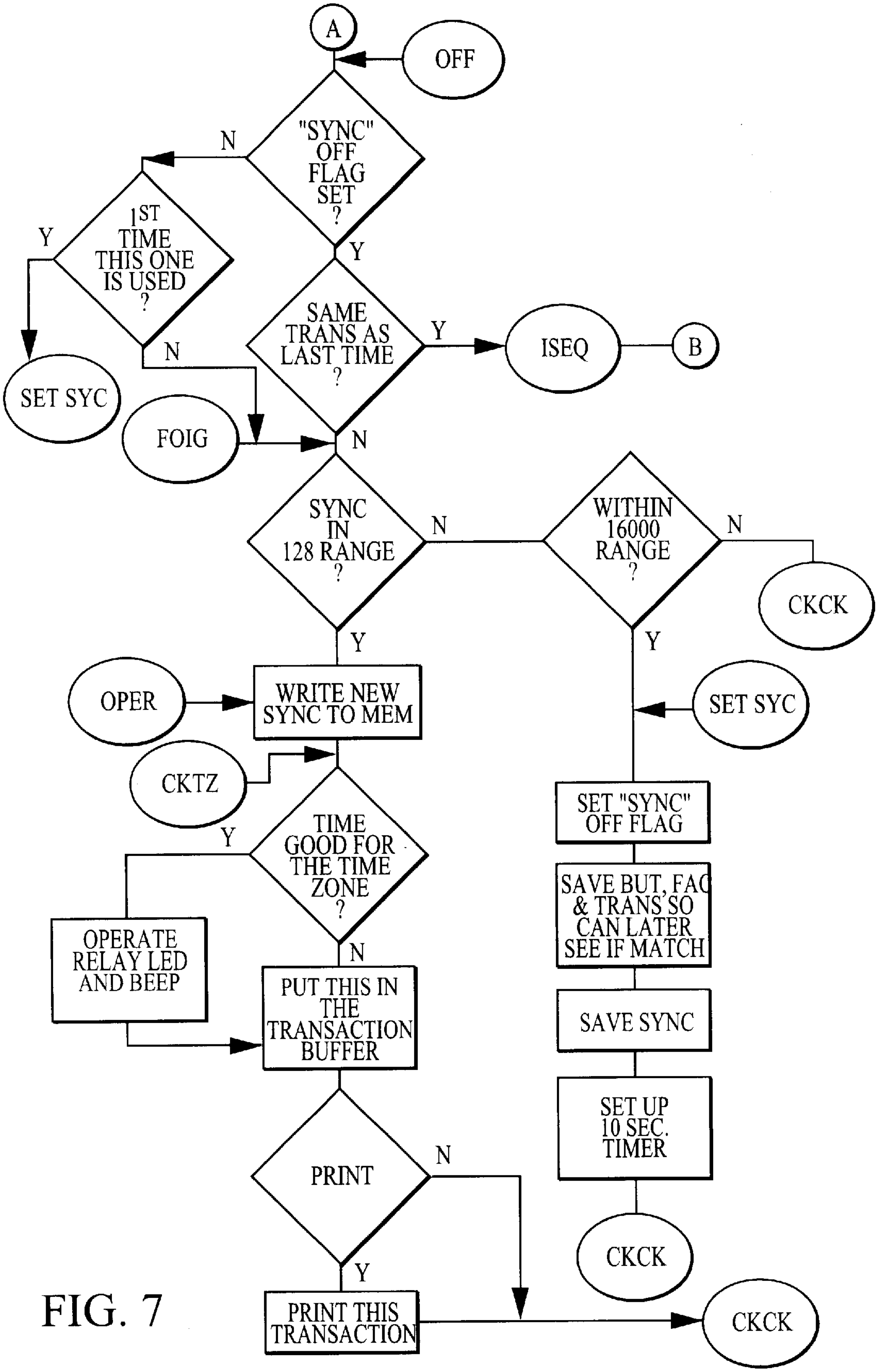
FIG. 7 is a flowchart illustrating one of the many alternative embodiments of the receiver algorithm when a new transmitter is pressed a first time.

If the signals matched the logic moves back to FIG. 7 block 368. The new sync signal, also known as a first-second sync signal, is saved to EE memory 366. In the preferred embodiment, the first-second sync signal is saved to EE memory only if it is within 2 of the first sync signal. The time zone is again checked 370 and 372. If the transmitter is valid and the time zone is proper, the transmitter signal is put in a transaction buffer for output clearance. Although the receiver is now satisfied and will output a clearance signal, persons of ordinary skill in the art will understand that a variety of actions can occur in addition to or instead of outputting a clearance signal, such as printing the transaction for record 379.

The receiver is now reset to housekeeping ("CKCK" FIG. 7 block 300) and monitors for incoming signals. If the first transmitter is pressed again, first-third signal, the logic, as before, verifies the 64 bit signal, decrypts the signal and checks whether the discrimination signals match. It then moves to determine whether the first-third subset signal is in memory 322. Since the information for this transmitter is already in memory, the "SYNC OFF FLAG" 352 is not set. Also, since this is not the first time this transmitter is used 354, the logic bypasses all the other sequence and only determines whether the new sync number, first-third sync number, is within 128 (block 364) or is between 129 and 16,000 (block 390), as described before. If it is within 128, the new sync number is saved to memory 366 and the logic sends the signal for output 376. If it is within 16,000, the "SYNC OFF FLAG" is set and the first-third signal and the new sync number are saved to RAM 398 for another validation 300.

In some of the many alternative embodiments of the invention, a valid time zone can operate a relay for the clearance output. In addition, all clearance output or transactions can be saved to a transaction buffer, for printing, record-keeping, or other purposes.

While the preferred embodiment and method of the invention has been described with some specificity, the description and drawings set forth herein are not intended to be delimiting, and persons of ordinary skill in the art will understand that various modifications may be made to the embodiments and methods discussed herein without departing from the scope of the invention, and all such changes and modifications are intended to be encompassed within the appended claims.

What is claimed is:

1. Apparatus for multiple-user security systems adaptable for sending and decoding encrypted signals, including:

a first transmitter capable of emitting a first signal that including a button signal portion, a facility code signal portion, a first transmitter identification signal portion, a discrimination signal portion, and a first synchronization signal portion, at least one of said portions being encrypted;

a receiver capable of receiving said first signal and decoding said encrypted portion of said first signal, said receiver including a timer for computing duration between emitted signals and a reference discrimination code, said receiver further capable of automatically recognizing said first transmitter when a button on said receiver first transmitter is pressed;

a second transmitter capable of emitting a second signal;

an algorithm for recognizing and processing said second transmitter's signal without manually teaching said second transmitter into said receiver; and said receiver being capable of outputting a command affecting a secured clearance based on said algorithm.

2. The apparatus of claim 1, wherein said receiver and said first transmitter are associated upon pressing a button and emitting said first signal from said first transmitter and upon said discrimination signal portion matching said reference discrimination code.

3. Apparatus for multiple-user security systems adaptable for sending and decoding encrypted signals, including:

a first transmitter capable of emitting a first signal that including a button signal portion, a facility code signal portion, a first transmitter identification signal portion, a discrimination signal portion, and a first synchronization signal portion, at least one of said portions being encrypted;

a receiver capable of receiving said first signal and decoding said encrypted portion of said first signal, said receiver including a timer for computing duration between emitted signals and a reference discrimination code, said receiver further capable of automatically recognizing said first transmitter when a button on said first transmitter is pressed;

a second transmitter capable of emitting a second signal;

an algorithm for recognizing and processing said second transmitter's signal without manually teaching said second transmitter into said receiver; and said receiver being capable of outputting a command affecting a secured clearance based on said algorithm, and wherein said receiver and said first transmitter are associated upon pressing a button and emitting said first signal from said first transmitter and upon said discrimination signal portion matching said reference discrimination code; and wherein said receiver includes a memory and said first signal includes a first subset signal; said first subset signal and said first synchronization signal are adaptably stored in said memory if said first subset signal was not previously stored, and if previously stored, said first synchronization signal only is adaptably stored; said first subset signal including said button signal portion, said facility code signal portion, and said first transmitter identification signal portion.

4. The apparatus of claim 3, further including said first transmitter adaptable for emitting a first-second signal, said first-second signal including a first-second subset signal, a first-second synchronization signal and said discrimination signal; said first-second synchronization signal being higher in number than said first synchronization signal, and said first-second subset and said first-second synchronization signal being stored in said receiver memory if said first-second subset was not previously stored, and if previously stored, said first-second synchronization signal only being so stored.

5. The apparatus of claim 4, further including said receiver being capable of storing said first-second synchronization and said first-second subset or said first-second synchronization only, if said algorithm determines that said discrimination signal matches said reference discrimination code and verifies that part of said first-second subset signal including said button signal appropriately corresponds to data previously stored in said memory.

6. The apparatus of claim 4, further including said receiver being adaptable for sending a clearance signal to a means adaptable for processing and using said clearance signal including permitting access to secured areas; and wherein said receiver is not adaptable for sending a clearance signal if said first-second synchronization signal number is between said higher number and a much larger number.

7. The apparatus of claim 5, further including said receiver adaptable for storing said first-second synchronization signal if said first-second synchronization signal is emitted within a sufficiently short time of said first synchronization signal.

8. The apparatus of claim 4, including said second transmitter and said second signal, said second signal including a second synchronization signal; said second transmitter being adaptable for emitting a second-second signal, said second-second signal including a second-second subset signal, a second-second synchronization signal and said discrimination signal portion, said second-second subset signal including said button signal portion, said facility code signal portion, and a second transmitter identification signal portion.

9. The apparatus of claim 8, further including said receiver adaptable for storing said second-second subset signal and said second-second synchronization signal if said second-second subset signal was not previously stored, and if previously stored, then storing said second-second synchronization signal only.

10. The apparatus of claim 9, further including said receiver adaptable for storing said second-second subset signal and said second-second synchronization signal or just said second-second synchronization signal if: said discrimination signal matches said reference discrimination code, part of said second-second subset signal including said button signal matches similar signals in said receiver memory, said second-second synchronization signal is emitted within a sufficiently short time of said second synchronization signal, and said second-second synchronization signal is sufficiently higher in number than said second synchronization signal.

11. The apparatus of claim 3, wherein said button signal, said facility number signal, a range of transmitter identification number signal and a time zone signal are stored in said memory before the button on said first transmitter is pressed.

12. The apparatus of claim 11, further including said receiver adaptable for storing said first synchronization signal upon verifying that said discrimination signal matches said reference discrimination signal.

13. The apparatus of claim 12, further including said first transmitter adaptable for emitting a first-second signal including a first-second synchronization signal, a first-second subset signal and said discrimination signal and wherein said first-second synchronization signal is adaptably stored in said receiver memory if: said first-second synchronization signal is sufficiently higher in number than said first synchronization signal, said discrimination signal matches said reference discrimination code, and part of said first-second subset signal matches similar signals in said memory.

14. The apparatus of claim 12, wherein said receiver further including a means adaptable for processing and using said clearance signal for security purposes including permitting access to secured areas.

15. Apparatus for security systems including: a first transmitter for sending a first signal, said first signal including a non-encrypted signal portion and an encrypted signal portion including a first synchronization signal segment;

a second transmitter for sending a second signal; and a receiver having a reference discrimination code, algorithm, and memory for processing multiple transmitters, said receiver having a normal automatic operate/learn mode and having means for being manually placed into an initial learn mode;

wherein said first transmitter and said receiver are associated when a signal from said first transmitter is transmitted while said receiver is in a manual learn mode; and wherein said first transmitter and said second transmitter are further associated with said receiver via subsequent signal transmissions while said receiver is in an automatic operate/learn mode.

16. The apparatus of claim 15, further including said first transmitter adaptable for emitting said first signal, said first signal including a button signal, a facility code signal, a first transmitter identification signal, a discrimination signal and said first synchronization signal; and said receiver being adaptable for storing part of said first signal when said algorithm verifies that part of said first signal includes said discrimination code.

17. The apparatus of claim 16, further including said receiver adaptable for decrypting said encrypted signal before part of said first signal is stored in said receiver.

18. The apparatus of claim 17, further including said first transmitter adaptable for emitting a first-second signal including a first-second synchronization signal, said receiver being adaptable for recognizing and storing part of said first-second signal including said first-second synchronization signal if said algorithm is able to verify a logic sequence including that (a) said first-second synchronization signal is emitted within a sufficiently short time following said first synchronization signal and (b) said first-second synchronization signal is sufficiently higher in number than said first synchronization signal.

19. The apparatus of claim 18, further including means adaptable for processing and using a clearance signal for security purposes, said processing and using including permitting access to secured areas if said first-second synchronization signal is sufficiently higher in number than said first synchronization signal.

20. The apparatus of claim 19, further including said second transmitter and wherein said second transmitter is adaptable for emitting said second signal including said discrimination signal and a second synchronization signal and adaptable for emitting a second-second signal including said discrimination code and a second-second synchronization signal.

21. The apparatus of claim 20, further including said receiver being adaptable for recognizing and storing part of said second-second signal including said second-second synchronization signal and adaptable for emitting said clearance signal if (a) part of said second-second signal matches similar signals in said receiver memory and (b) said second-second synchronization signal is sufficiently higher in number than said second synchronization signal.

22. Apparatus for security systems including:

a first transmitter for sending a first signal, said first signal including a non-encrypted signal portion and an encrypted signal portion including a first synchronization signal segment;

a second transmitter for sending a second signal;

a receiver having a reference discrimination code, algorithm, and memory for processing multiple transmitters; and means adaptable for processing and using a clearance signal for security purposes, said processing and using including permitting access to secured areas if said first-second synchronization signal is sufficiently higher in number than said first synchronization signal;

wherein said first transmitter and said receiver are associated when a signal from said first transmitter is transmitted while said receiver is in a learn mode and wherein said first transmitter and said receiver are further associated via subsequent signal transmissions from said first transmitter;

wherein said first transmitter is adaptable for emitting said first signal, said first signal including a button signal, a facility code signal, a first transmitter identification signal, a discrimination signal and said first synchronization signal; and said receiver being adaptable for storing part of said first signal when said algorithm verifies that part of said first signal includes said discrimination code;

wherein receiver is adaptable for decrypting said encrypted signal before part of said first signal is stored in said receiver;

wherein said first transmitter is adaptable for emitting a first-second signal including a first-second synchronization signal, said receiver being adaptable for recognizing and storing part of said first-second signal including said first-second synchronization signal if said algorithm is able to verify a logic sequence including that (a) said first-second synchronization signal is emitted within a sufficiently short time following said first synchronization signal and (b) said first-second synchronization signal is sufficiently higher in number than said first synchronization signal;

wherein said second transmitter is adaptable for emitting said second signal including said discrimination signal and a second synchronization signal and adaptable for emitting a second-second signal including said discrimination code and a second-second synchronization signal; and wherein said receiver is adaptable for recognizing and storing part of said second-second signal including said second-second synchronization signal and adaptable for emitting said clearance signal if (a) part of said second-second signal matches similar signals in said receiver memory and (b) said second-second synchronization signal is sufficiently higher in number than said second synchronization signal, adaptable for emitting said clearance signal if said algorithm determine that said second-second synchronization is emitted within a sufficiently short time of said second synchronization signal.

23. Apparatus for security systems including: a first transmitter for sending a first signal, said first signal including a button signal, a facility code signal, a first transmitter identification signal, a discrimination signal, said first signal including a non-encrypted signal portion and an encrypted signal portion including a first synchronization signal segment;

a second transmitter for sending a second signal; and a receiver having a reference discrimination code algorithm, and memory for processing multiple transmitters said receiver having a normal automatic operate/learn mode and having means for being manually placed into an initial learn mode, said receiver being adaptable for storing part of said first signal when said algorithm verifies that part of said first signal includes said discrimination signal, said receiver adaptable for decrypting said encrypted signal before part of said first signal is stored in said receiver;

wherein said first transmitter and said receiver are associated when a signal from said first transmitter is transmitted while said receiver is in a manual learn mode;

wherein said first transmitter and said second transmitter are further associated with said receiver via subsequent signal transmissions while said receiver is in an automatic operate/learn mode;

wherein said first transmitter is adaptable for emitting a first-second signal including a first-second synchronization signal, said receiver being adaptable for recognizing and storing part of said first-second signal including said first-second synchronization signal if said algorithm is able to verify a logic sequence including that (a) said first-second synchronization signal is emitted within a sufficiently short time following said first synchronization signal and (b) said first-second synchronization signal is sufficiently higher in number than said first synchronization signal;

wherein the apparatus further includes a means adaptable for processing and using a clearance signal for security purposes, said processing and using including permitting access to secured areas if said first-second synchronization signal is sufficiently higher in number than said first synchronization signal;

wherein said second transmitter is adaptable for emitting said second signal including said discrimination signal and a second synchronization signal and adaptable for emitting a second-second signal including said discrimination code and a second-second synchronization signal;

wherein said receiver is adaptable for recognizing and storing part of said second-second signal including said second-second synchronization signal and adaptable for emitting said clearance signal if (a) part of said second-second signal matches similar signals in said receiver memory and (b) said second-second synchronization signal is sufficiently higher in number than said second synchronization signal, and wherein said second transmitter is adaptable for emitting a second-third signal, said second-third signal including a second-third synchronization signal, said receiver being adaptable for storing part of said second-third signal including said second-third synchronization signal and being further adaptable for emitting said clearance signal if part of said second-third signal matches similar signals in said receiver memory and said second-third synchronization signal is sufficiently higher in number than said second-second synchronization signal.

24. The apparatus of claim 23, further including said receiver being adaptable for starting a timer and adaptable for storing part of said second-third signal if said second-third synchronization signal is much higher in number than said second-second synchronization signal.

25. Apparatus for security systems including: a first transmitter for sending a first signal, said first signal including a non-encrypted signal portion and an encrypted signal portion including a first synchronization signal segment; a second transmitter for sending a second signal; a receiver having a reference discrimination code, algorithm, and memory for processing multiple transmitters; said first transmitter and said receiver being associated when a signal from said first transmitter is transmitted while said receiver is in a learn mode and wherein said first transmitter and said receiver are further associated via subsequent signal transmissions from said first transmitter, said first signal including a button signal, a facility code signal, a first transmitter identification signal, and a discrimination signal; and said receiver being adaptable for storing part of said first signal when said algorithm verifies that part of said first signal includes said discrimination code, and wherein said button signal, said facility code signal, a range of transmitter identification signal, and a time zone signal are stored in said receiver before said first transmitter transmits a first signal.

26. The apparatus of claim 25, further including said first transmitter adaptable for emitting a first-second signal including a first-second synchronization signal and wherein said receiver is adaptable for storing said first-second synchronization signal and emitting a clearance signal if (a) said first-second signal matches corresponding information in said receiver memory, and (b) said first-second synchronization signal is sufficiently higher in number than and emitted within a sufficiently short time of said first synchronization signal.

27. The apparatus of claim 26, further including a second transmitter adaptable for emitting a second signal, said second signal including a second synchronization signal and a second-second signal including a second-second synchronization signal, said receiver being adaptable for storing said second-second synchronization signal if said algorithm determines that (a) part of said second-second signal matches corresponding information in said receiver memory and (b) said second-second synchronization signal is sufficiently higher in number than said second synchronization signal.

28. A method of providing access to secured areas by utilizing a receiver and a plurality of transmitters, the method comprising the steps of:

causing a first transmitter to emit a first signal, said first signal comprising a first subset signal, a discrimination signal and a first synchronization signal, said first subset signal including a button signal, a facility code signal and a first transmitter identification signal;

receiving, decrypting and processing said first signal by said receiver, said receiver including a reference discrimination code;

storing said first signal in said receiver if an algorithm in said receiver verifies and accepts said first signal;

processing a clearance signal and operating a clearance function;

causing a second transmitter to emit a second signal, said second signal including a second synchronization signal; and recognizing said second transmitter without manually teaching said receiver said second signal.

29. A method of providing access to secured areas by utilizing a receiver and a plurality of transmitters, the method comprising the steps of:

causing a first transmitter to emit a first signal, said first signal comprising a first subset signal, a discrimination signal and a first synchronization signal, said first subset signal including a button signal, a facility code signal and a first transmitter identification signal;

receiving, decrypting and processing said first signal by said receiver, said receiver including a reference discrimination code;

storing said first signal in said receiver if an algorithm in said receiver verifies and accepts said first signal;

processing a clearance signal and operating a clearance function;

causing a second transmitter to emit a second signal, said second signal including a second synchronization signal;

recognizing said second transmitter without manually teaching said receiver said second signal; and comparing said discrimination signal with said reference discrimination code and storing said first subset signal along with said first synchronization signal in a memory, and if said first subset signal is previously stored, only storing said first synchronization signal.

30. The method as in claim 29, further including the steps of:

emitting from said first transmitter a first-second signal, said first-second signal including a first-second subset signal, said discrimination signal and a first-second synchronization signal, said first-second signal being emitted within a sufficiently short time after said emission of said first signal;

comparing (a) said discrimination signal with said reference discrimination code and (b) part of said first-second subset signal, including said button signal, with signals previously stored in said memory;

storing said first-second subset signal along with said first-second synchronization signal in said memory, and if said first-second subset signal was previously stored, only storing said first-second synchronization signal; and sending a clearance signal to a means for processing said first-second signal.

31. The method as in claim 30, wherein said storing only takes place if said first-second synchronization is sufficiently higher in number than said first synchronization signal.

32. The method as in claim 30, wherein the first-second synchronization signal is much larger than said first synchronization signal and wherein said first-second synchronization signal and part of said first-second subset signal are stored in said memory but no clearance signal is emitted.

33. A method of providing access to secured areas by utilizing a receiver and a plurality of transmitters, the method comprising the steps of:

causing a first transmitter to emit a first signal, said first signal comprising a first subset signal, a discrimination signal and a first synchronization signal, said first subset signal including a button signal, a facility code signal and a first transmitter identification signal;

receiving, decrypting and processing said first signal by said receiver, said receiver including a reference discrimination code;

storing said first signal in said receiver if an algorithm in said receiver verifies and accepts said first signal;

processing a clearance signal and operating a clearance function;

causing a second transmitter to emit a second signal, said second signal including a second synchronization signal;

recognizing said second transmitter without manually teaching said receiver said second signal; and wherein said second signal includes a second subset signal and said discrimination signal, said second subset signal further including said button signal, said facility code signal and a second transmitter identification number signal; said method further including receiving and processing said second signal by said receiver including verifying said discrimination signal against said reference discrimination code, verifying part of said second subset signal including said button signal, and storing part of said second signal in said memory.

34. The method as in claim 33, further comprising the steps of emitting a second-second signal from said second transmitter including a second-second synchronization signal, said second-second synchronization signal being emitted within a sufficiently short time of said second signal and being sufficiently higher in number than said second synchronization signal, storing only part of said second-second signal including said second-second synchronization signal not previously in said memory, and sending a clearance signal.

35. The method as in claim 33, further including comparing part of said second subset signal including said button signal with similar signals in said memory before storing part of said second subset signal not previously stored in said memory.

36. The method as in claim 34 including the steps of emitting a second-third signal from said second transmitter, said second-third signal including a second-third synchronization signal and said button signal; comparing part of said second-third signal with similar signals in said memory; and storing said second-third synchronization signal in said memory and sending a clearance signal if said second-third synchronization signal is sufficiently higher in number than said second-second synchronization signal.

37. The method as in claim 34, further including the step of storing said second-third signal in said memory and setting a timer if said second-third synchronization signal is 128 to 16,000 times larger than said second-second synchronization signal.

38. A method of providing access to secured areas by utilizing a receiver and a plurality of transmitters, the method comprising the steps of:

causing a first transmitter to emit a first signal, said first signal comprising a first subset signal, a discrimination signal and a first synchronization signal, said first subset signal including a button signal, a facility code signal and a first transmitter identification signal;

receiving, decrypting and processing said first signal by said receiver, said receiver including a reference discrimination code;

storing said first signal in said receiver if an algorithm in said receiver verifies and accepts said first signal;

processing a clearance signal and operating a clearance function;

causing a second transmitter to emit a second signal, said second signal including a second synchronization signal;

recognizing said second transmitter without manually teaching said receiver said second signal; and manually inputting said button signal, said facility code signal, a range of transmitter identification number signals, and a time zone signal in memory before transmitting said first signal from said first transmitter.

39. The method as in claim 38, wherein said first subset signal includes a time zone signal, and wherein said method further including comparing said discrimination signal with said reference discrimination code and comparing said first subset signal with similar signals in said memory.

40. The method as in claim 39, including the steps of reading and saving said time zone signal, storing part of said first subset signal and said first synchronization signal, emitting a first-second signal from said first transmitter, said first-second signal including a first-second synchronization signal within a sufficiently short time of said first signal, comparing said first-second signal with said reference discrimination code and with said similar signals in said memory, and saving said first-second synchronization signal in said memory if said first-second synchronization signal is sufficiently higher in number than said first synchronization signal.

41. The method as in claim 40, including said receiver including a means for processing and controlling clearance signals, and wherein said method further including emitting from said second transmitter a second signal including a second synchronization signal and a second-second signal including a second-second synchronization signal within a sufficiently short time of one another, and storing said second-second synchronization signal if said second-second synchronization signal is sufficiently higher in number than said second synchronization signal.

42. An electronic logic circuit for use in a security system for controlling access to a selected area, including:

a receiver to receive discrete signals from a plurality of transmitters;

circuitry to process said discrete signals down one of four paths, including a first path if the signal in the first transmission to said receiver and said receiver is in manual learning mode, a second path if the signal is the second transmission from the first transmitter, a third path if the signal is the first transmission to said receiver from any subsequent transmitter, and a fourth path if the signal is the second transmission from such a subsequent transmitter;

said first path operating in that order to "learn" the first transmitter into said logic circuit, said third and fourth paths operating to learn subsequent transmitters into said logic circuit, and said second path subsequently further operating to directly actuate a control mechanism for releasing or locking a barrier to said selected area.

43. The circuit of claim 42, in which said first and second paths are operable only when a learn switch has been manually set by a user.

44. The circuit of claim 42, in which identification information regarding the transmitters usable with said receiver is pre-programmed into said circuit, rendering said first and second paths superfluous and eliminating any need for a user to manually set a learn switch.

45. The circuit of claim 42 or 43 or 44, in which said receiver receives and processes a multipart signal into at least three usable segments, those segments comprising button information, facility information, and a synchronization signal.

46. A system for controlling access, including:

an obstruction movable between an first position and a second position;

a control system to move said obstruction between said first and said second positions, said control system including a receiver and a plurality of transmitters each configured to communicate with said receiver;

said control system further including a code hopping security feature operative between (a) said receiver and (b) each of said plurality of transmitters independent of other transmitters, said rolling security code having to be initially learned into the receiver before each transmitter can be used to actuate said obstruction;

said control system including means to permit automatic learning by the receiver of at least the second of said plurality of transmitters and all subsequent transmitters, without the need for manually setting said receiver into a learn mode.

47. The system of claim 46, wherein said receiver and said transmitters are programmed to communicate a button code between them, in connection with operation of said control system.

48. The system of claim 46, wherein said receiver and said transmitters are programmed to communicate a facility code between them, in connection with operation of said control system.

49. The system of claim 47 or claim 48, wherein said control system includes a keyboard operatively communicating with said receiver, said keyboard capable of programming said receiver with said code.

50. The system of claim 49, wherein said keyboard is further capable of programming said receiver with ID codes unique to each transmitter.

51. The system of claim 46 or claim 47 or claim 48, in which said receiver includes a manually-actuated learn mode, said manual actuation placing said receiver in a learn mode capable of receiving and learning from a first of said transmitters at least a transmitter ID transmitted from said first transmitter.

52. The system of claim 46, in which said receiver includes a manually-actuated learn mode, wherein said receiver and said first transmitter are also programmed to communicate a button code between them in connection with operation of said control system, and said receiver is configured to store and use said button code for said first transmitter and all subsequent transmitters.

53. The system of claim 46, in which said receiver includes a manually-actuated learn mode, wherein said receiver and said first transmitter are also programmed to communicate a facility code between them, in connection with operation of said control system, and said receiver is configured to store and use said facility code for said first transmitter and all subsequent transmitters.

54. The system of claim 51, further including computer apparatus communicating with said receiver, said computer apparatus capable of being programmed with one or more of (a) said transmitter IDs, (b) a button associated with said transmitters, and (c) a facility code associated with said facility.

55. The system of claim 46, wherein said first position and said second position are open and closed, respectively.

56. The system of claim 46 or claim 47, wherein said obstruction is an access gate to a facility.

57. A system for communicating between a plurality of transmitters and a receiver, including:

said plurality of transmitters each including a transmittable ID that distinguishes it from said other transmitters and a transmittable code hopping security feature;

said receiver programmed to automatically switch between a normal operate mode and a learn mode; and said receiver configured to learn in said transmittable ID and said transmittable rolling security code for a majority of said transmitters via said automatic switching into learn mode.

58. The system of claim 57, in which said receiver includes a manual learn apparatus, said manual learn apparatus actuated to learn at least an initial one of said transmitters into said receiver.

59. The system of claim 57, in which the data learned into said receiver includes at least one of a transmitter ID code, a facility code, and a button code.

60. An access control system, including:

at least one receiver for receiving signals from a plurality of transmitters;

a first gatekeeper apparatus, said first gatekeeper apparatus including computer apparatus using at least a unique ID for each of a plurality of transmitters; and a second gatekeeper apparatus, said second gatekeeper apparatus including rolling security code means communicating between each of said transmitters and said receiver; said receiver configured to automatically learn in at least said rolling security code means of said second gatekeeper apparatus, without the need to manually set said receiver into a learn mode.

* * * * *